Patented Apr. 6, 1948

2,438,975

UNITED STATES PATENT OFFICE 2,438,975

AN ALKYL CELLULOSE STABILIZED WITH AN N,N,DIALKYLATED DIAMINE

John Edward Jones, Spondon, near Derby, England, assignor, by mesne assignments, to Celanese Corporation of America, a corporation of Delaware No Drawing. Application November 30, 1944, Serial No. 566,019. In Great Britain February 25, 1944

6 Claims. (Cl. 106—186)

This invention is concerned with improvements in cellulose ethers having an improved stability.

In the production or use of articles made of or containing cellulose ethers the cellulose ethers may be subjected to high temperatures. This may be the case for example in the production of articles from moulding compositions containing cellulose ethers, and also when they are employed as the basis of coatings and as insulating materials for electrical conductors, condensers and the like. Under such conditions, particularly in the presence of air, it has been found that the viscosity of the cellulose ethers frequently falls considerably and that this fall in viscosity is accompanied by deterioration in other properties of the ethers. For example the strength of the articles may be reduced and they may become brittle. This may occur even on storage in the presence of air.

It has now been discovered that the stability of unstable cellulose ethers may be considerably improved by incorporating in them small proportions of N,alkylated diamines.

Preferably the diamines contain at least two alkyl radicals attached to the nitrogen atoms and preferably also the alkyl radicals contain less than seven carbon atoms. They may for example be methyl, ethyl, butyl or hexyl radicals.

N,N,diethyl-ethylene diamine and tetra-ethyl-p-phenylene diamine are the compounds which it is preferred to employ as they have been found to give a remarkable improvement in stability. Other N,alkylated diamines which may be employed and which also increase the stability of unstable cellulose ethers to a substantial extent are tetra-methyl and tetra-ethyl ethylene diamines, the butyl ethylene diamines, the ethyl and butyl hexamethylene diamines and other N,alkyl-alkylene diamines and the alkylated diamino-benzenes, e. g. the diethyl- and dibutyl-p-phenyl diamines and the corresponding tetraethyl and tetrabutyl compounds.

In most cases it is desirable to employ compounds which are substantially colourless and do not colour the cellulose ethers, at least to any great extent, after a heat treatment. Moreover, it is desirable to use substances of low volatility, having, for example, a boiling-point of at least 100° C. and preferably higher, for instance above 130° C.

The cellulose ethers which are at present of the greatest industrial importance are the ethers, particularly ethyl cellulose and other alkyl celluloses containing up to six carbon atoms in the alkyl radicles, which are soluble in hydrophobe organic solvents, and it is with the stabilisation of such ethers that the present invention is particularly concerned. Such ethers usually contain more than two ether radicles per $C_6H_{10}O_5$ unit of cellulose, for example 2.5, 2.8 or even more, and are soluble in benzene or toluene, either alone or when mixed with an alcohol, particularly ethyl alcohol.

The incorporation of the stabilising agent with the cellulose ether may be effected by forming a solution containing both the ether and the stabilising agent. When the ether is prepared in solution as, for example, when ethyl cellulose is produced in the presence of a large excess of ethyl chloride which acts both as an etherifying agent and also as solvent, or when it is produced using di-ethyl sulphate in the presence of toluene as a solvent, the incorporation of the stabilising agent may be effected before separation of the ether from the etherification solution. Usually, however, it is preferable to carry out the incorporation of the stabilising agent with the ether in an operation separate from that of the production of the ether. For example, after the ether has been separated from the etherification medium and washed, it may be dissolved in a suitable solvent and then either the stabilising agent may be dissolved in the solution or a solution of the stabilising agent may be mixed with the cellulose ether solution. After thorough mixing of the stabilising agent with the cellulose ether in solution, the mixture of ether and stabilising agent may be precipitated by mixing the solution with a suitable non-solvent for the ether. Preferably the liquid employed is a non-solvent also for the stabilising agent, though even if the liquid has some solvent action on the stabilising agent the ether usually carries down with it some of the stabilising agent. In such circumstances, however, it is of course necessary in deciding how much stabilising agent is to be incorporated with the cellulose ether solution to take into account the amount which remains in solution after precipitation of the ether.

Incorporation of the stabilising agent with the ether may also be effected by treating the ether in solid form with a solution of the agent. For example, the ether may be suspended in 50 or 100 times its weight of an aqueous or aqueous-alcoholic solution of N,N-diethyl ethylene diamine or other stabilising agent, containing 0.1, 1 or even 5% of agent based on the weight of the ether, and boiled for 30 minutes to 1 hour, or allowed to stand at atmospheric temperature for a longer period, e. g. 2 hours, after which it is filtered off, washed, preferably with distilled water, and dried at 95–100° C. Again, the ether may be mixed for 1 or 2 hours with a solution of a stabilising agent in an organic liquid which has a swelling action on the ether, after which the liquid is removed and the ether dried. Removal may be effected by decantation, followed by drying off the ether at a temperature below that at which the liquid tends to soften the ether too much and make it sticky. Alternatively, if the liquid has little swelling action it may be removed by pressure, e. g. in a centrifuge, and the ether then dried as described above. A further method of removing residual liquid consists in washing the ether with a liquid which is a solvent for the liquid employed for impregnation and a non-solvent for the ether and the stabilising agent. Incorporation of the stabilising agent with the ether in suspension has the advantage that it avoids the expense in time and materials involved in dissolving and precipitating the ether.

The incorporation of the stabilising agent with the ether may be effected at any stage during its conversion into an industrial article, e. g. a filament, foil or moulded article. For instance, the stabiliser may be incorporated with an ether simultaneously with the incorporation of a plasticiser during the production of a moulding composition. Thus the ether, plasticiser and stabilising agent may be dissolved in a common solvent which is subsequently removed, or the ether and plasticiser may be dispersed in water or other non-solvent in which the stabilising agent is dissolved and the non-solvent then driven off. According to another method the ether, plasticising agent and stabilising agent may be dissolved at a super-atmospheric temperature in a liquid which is a non-solvent for the ether at atmospheric temperature, and the solution then cooled so that the ether separates out, after having absorbed plasticiser and stabilising agent.

Again a cellulose ether and a stabilising agent may be dissolved in a solvent liquid and the solution formed employed for the manufacture of filaments, foils and the like by dry- or wet-spinning processes, or as a coating composition.

Up to a point the degree of stabilisation obtained increases with increase in the proportion of stabilising agent to ether, but the optimum proportion will vary, for example with the degree of impurity of the ether and with the molecular weight and activity of the stabilising agent. In many cases it is not necessary to incorporate more than 0.05 or 0.1% of stabilising agent or 0.01 or 0.02% of basic nitrogen based on the weight of the cellulose ether in the ether, though in other cases proportions as high as 0.5 or even 1% of agent or 0.1 or 0.2% of basic nitrogen may be employed. As a rule the best proportion of stabiliser to ether is from 0.05 to 0.5% or a percentage of basic nitrogen of about 0.01 to 0.1%.

Some alkylated diamines yield coloured compounds when oxidised and if this occurs in the present process not only are they no longer available to act as stabilising agents in the cellulose ether, but also their colour may affect the value of the cellulose ether for certain purposes. Usually this oxidation process takes place most rapidly in an alkaline medium and in order to reduce the development of colour as far as possible it is desirable in any aqueous treatments of the cellulose ether, after incorporation of the stabilising agent with the ether, for example in separation of the ether from the liquid employed for incorporating the stabiliser, to use a neutral or even slightly acid aqueous treatment medium. For example if the cellulose ether and stabiliser are precipitated from solution and washed by means of water it is desirable to use distilled water or water which has been treated to give it a pH value of 7 or slightly less.

The process of the present invention is illustrated by the following examples, which describe methods of improving the stability to heat of different samples of ethyl cellulose. The ethyl celluloses used were of the type soluble in mixtures of toluene and butyl alcohol, and their viscosities were determined from the rate of flow of 5% solutions in this solvent mixture. The figures for the stabilities of the ethyl celluloses represent the viscosity of a 5% solution in this solvent mixture of the ethyl cellulose after it has been heated in air at 150° C. for 1 hour, expressed as a percentage of the viscosity of a 5% solution of the ethyl cellulose before heating.

*Example I*

A medium viscosity ethyl cellulose having a stability of about 6% was dissolved in alcohol containing about 0.1% of tetra-ethyl-para-phenylene diamine based on the weight of the ethyl cellulose. The ether was then precipitated and washed with distilled water and after drying its stability was found to have increased to over 80%.

*Example II*

A sample of ethyl cellulose was soaked for about two hours in a dilute solution of N,N,diethyl-ethylene diamine in a mixture of 40 parts alcohol and 60 parts water. The ethyl cellulose was then removed, the excess liquor squeezed out and the ether dried. The treated ether had a stability of over 70% whereas the ether before treatment had a stability of less than 20%.

*Example III*

A sample of ethyl cellulose was dissolved in alcohol containing .1% by weight of N,N,diethyl-ethylene diamine. The ether was then precipitated by the addition of distilled water to the solution, washed with distilled water for six hours at 80° C. and dried at 95–100° C. The treated ether contained about .013% of nitrogen and had a stability of over 70% whereas the untreated ether had a stability of under 10%.

Having described my invention, what I desire to secure by Letters Patent is:

1. A composition of matter comprising an alkyl cellulose soluble in hydrophobe organic solvents and 0.05 to 1% of the weight of the alkyl cellulose of an N-alkylated diamine selected from the group which consists of N,N,dialkylated alkylene and phenylene diamines in which the N-alkyl substituent groups each contains less than 7 carbon atoms.

2. A composition of matter comprising an ethyl cellulose containing at least 2.0 ethyl groups for each $C_6H_{10}O_5$ unit, and 0.05 to 0.5% of the weight of the ethyl cellulose of an N-alkylated diamine selected from the group which consists of N,N,dialkylated alkylene and phenylene diamines in which the N-alkyl substituent groups each contains less than 7 carbon atoms.

3. A composition of matter comprising an ethyl cellulose containing at least 2.0 ethyl groups for each $C_6H_{10}O_5$ unit, and 0.05 to 0.5% of the weight of the ethyl cellulose of an N,N,dialkylated alkylene diamine in which the N-alkyl substituent groups and the alkylene group each contain less than 7 carbon atoms.

4. A composition of matter comprising an ethyl cellulose containing at least 2.0 ethyl groups for each $C_6H_{10}O_5$ unit, and 0.05 to 0.5% of the weight of the ethyl cellulose of a tetra-(N-alkyl) phenylene diamine in which the N-alkyl substituent groups contain less than 7 carbon atoms.

5. A composition of matter comprising an ethyl cellulose, which is soluble in hydrophobe organic solvents and contains at least 2 ethyl radicals per $C_6H_{10}O_5$ unit, and between 0.05 and 0.5% based on the weight of the ethyl cellulose of N,N,diethyl-ethylene-diamine.

6. A composition of matter comprising an alkyl cellulose, which is soluble in hydrophobe organic solvents and which contains up to 6 carbon atoms in the alkyl radicals and at least 2 alkyl radicals per $C_6H_{10}O_5$ unit, and between 0.05 and 0.5% based on the weight of the alkyl cellulose of tetra-ethyl-paraphenylene-diamine.

JOHN EDWARD JONES.

REFERENCES CITED

The following references are of record in the file of this patent:

UNITED STATES PATENTS

| Number | Name | Date |
|---|---|---|
| 2,333,294 | Chenicek | Nov. 2, 1943 |
| 2,294,724 | Dreshfield | Sept. 1, 1942 |
| 1,460,097 | Donohue et al. | June 26, 1923 |

OTHER REFERENCES

"Hercules Ethyl Cellulose—Properties and Uses," Hercules Powder Co., Wilmington, Del., March 1944, pages 15–16.

"Cellulose and Cellulose Derivatives," Ott, Interscience Publishers, Inc., New York, 1943, page 889.